3,118,865
OLEFIN POLYMERIZATION CATALYST
John MacMillan Bruce, Jr. and Ivan Maxwell Robinson, Wilmington, Del., assignors to E. I. du Pont de Nemours and Company, Wilmington, Del., a corporation of Delaware
No Drawing. Filed Feb. 3, 1960, Ser. No. 6,376
23 Claims. (Cl. 260—93.7)

This invention relates to catalysts useful in the polymerization of ethylenically unsaturated hydrocarbons, and especially in the polymerization of ethylene.

It has recently been discovered that ethylene can be polymerized to high density, linear polymers at relatively low pressures by employing a catalyst system comprising a metal complex containing a transition metal in a reduced valence state. This complex is obtained by admixing a salt or alcoholate, preferably a halide, of a metal selected from metals forming groups IV–B, V–B and VI–B of the periodic table of elements (such as shown on page 392 of the Handbook of Chemistry and Physics, Chemical Rubber Publishing Company, 37th Ed.), with a reducing agent. Reducing agents capable of reducing the transition metals to the catalytically active state are organometallic compounds such as metal alkyls and aryls, metal hydrides, and certain active metals such as alkali metals. This type of catalyst has been referred to as a coordination catalyst, since it is believed that the polymerization of the ethylenically unsaturated monomer proceeds through the formation of a coordinate bond between the reduced metal in the complex and the monomer. This catalyst system has, furthermore, been found highly useful in polymerizing α-olefins such as propylene to high molecular weight solid polymers.

The objects of the present invention are to improve the efficiency and activity of such coordination catalysts involving a reduced transition metal.

It has now been discovered, in accordance with the present invention, that the activity of catalysts for polymerization of terminally unsaturated hydrocarbon monomers, comprising the product obtained on admixing in an inert liquid diluent a polyvalent transition metal halide, wherein the metal is an element of group IV–B, V–B or VI–B of the periodic table at a valance state above 2, with an organometallic compound having the general formula MR, where M is a metal selected from the class consisting of metals of group I–A, II and III–A of the periodic table, including combinations of metals in these groups, and R is a hydrocarbon radical, said organometallic compound consisting of metal bonded to hydrocarbon radicals, is surprisingly increased by the addition of an alkyl metal polyhalide containing at least two halogen atoms as an additional reducing agent.

In the polymerization of ethylene employing coordination catalysts, generally, e.g., a catalyst obtained by the reduction of a titanium or similar transition metal compound, it was found that the most active reducing agents are metal alkyls and metal aryls, such as lithium aluminum tetraalkyls, aluminum trialkyls and magnesium diaryls. The activity of catalysts employing such reducing agents as metal hydrides and some alkyl metal monohalides is considerably lower. A still lower activity results with the use of such reducing agents as alkyl metal dihalides and alkyl metal halides containing more than two halogens. Nevertheless, the extraordinary activity of catalysts obtained by employing a combination of reducing agents comprising metal alkyls or metal aryls, and alkyl metal polyhalides, does not merely reflect the additive effect of the metal alkyls and metal aryls with the alkyl metal polyhalides. Instead, the activity is the result of synergism between the metal alkyl or metal aryl and the alkyl metal polyhalide, the theoretical explanation for which is still in doubt.

The transition metal halides employed in the catalyst of the present invention are the halides of metals of group IV–B, V–B and VI–B of the periodic table of elements and, as such, include the halides of Ti, Zr and Hf in group IV–B, the halides of V and Nb in group V–B, and the halides of Cr, Mo, and W in group VI–B. The halides included are chlorides, oxychlorides, bromides, iodides and fluorides, the latter two, however, being less preferred than the chlorides and bromides. Trivalent, tetravalent and pentavalent halides may be employed. Those halides which are soluble in hydrocarbon solvents in the quantites required for polymerization are particularly preferred, since with soluble halides the reduction to the catalytically active state is more readily achieved. Examples of suitable halides are $TiCl_4$, $TiBr_4$, $VCl_4$, $VOCl_3$, $VCl_3$, $TiCl_3$, $ZrCl_4$, $CrCl_3$, $CrBr_3$ and $MoCl_5$.

The reducing agents employed to form the catalyst of the present invention are combinations of metal hydrocarbon compounds with alkyl metal polyhalides. The metals employed in the metal hydrocarbon compounds are, generally, although not necessarily so, selected from the alkali metals, alkaline earth metals and metals of group III–A of the periodic table of elements. The hydrocarbon radical attached to the metal may be an alkyl radical, an aryl radical, a cycloalkyl radical, an aralkyl radical, an alkenyl radical or an alkinyl radical. In general, the number of carbon atoms in the hydrocarbon radical is between 1 to 20 inclusive, although such is not critical. Representative examples of metal hydrocarbon compounds are sodium phenyl, sodium pentyl, potassium phenyl, potassium butyl, magnesium dimethyl, magnesium dioctyl, magnesium diphenyl, magnesium ditoluyl, cadmium dimethyl, cadmium diphenyl, aluminum triethyl, aluminum triisobutyl, aluminum triphenyl, aluminum trioctyl, aluminum trioctadecyl, aluminum tridecyl, trialuminum-tri(dihydromercene) - tetraisobutyl, aluminum tricyclohexyl, aluminum triethylcyclohexenyl, zinc diethyl, zinc dixylyl, lithium aluminum tetrabutyl, lithium aluminum tetraheptyl, sodium aluminum tetrabutyl, sodium aluminum tetraphenyl, sodium boron tetrapropyl and the like. The preparation of these compounds is known to those skilled in the art. The secondary reducing components with which the synergistic effect of the present invention occurs are alkyl metal polyhalides wherein the metal is selected from tri- or higher valent metals of groups III–A, IV–A and V–A of the periodic table of elements, the more readily available of which are aluminum, tin, lead, bismuth, and antimony. To achieve the synergistic effect, it is necessary that the alkyl metal polyhalides contain at least two halogens, which are preferably chlorine or bromine. The number of alkyl groups in the alkyl polyhalide appears to have no significant effect on the catalyst activity nor is the size of the alkyl group of effect in the formation of the catalyst, although it is generally preferred to employ alkyl polyhalides where the alkyl groups have less than 20 carbon atoms. In employing metals which are tetravalent or pentavalent, it is quite feasible to have more than one alkyl group and more than two halogens present in the alkyl metal polyhalide. The preferred alkyl metal polyhalides are alkyl aluminum dihalides which give rise to a very strong synergistic effect. They are, furthermore, readily prepared and low in cost.

The catalyst employed in the present invention may be formed in various ways. It is possible to admix the catalyst components in a prior separate step, or it is possible to admix the components in the presence of the monomer. Generally, the catalyst components are admixed in the presence of a liquid diluent which can also serve as the polymerization medium and in which the individual catalyst components are soluble. This liquid diluent may be an inert hydrocarbon solvent or a liquid monomer. The catalyst components, particularly the polyvalent metal halides, are reacted with the reducing agents in the form of a solution to obtain maximum activity of the resulting catalyst complex. The order in which the catalyst components are admixed is of minor significance, although it is preferred to add the primary reducing agent simultaneously with or after the addition of the alkyl metal polyhalide. The ratios of the catalyst components can vary over a wide range, but should be sufficient to reduce the transition metal at least in part to a valence state below 3. In general, the highest activity of the catalyst system is found in a reducing agent to transition metal halide molar ratio ranging from 0.3 to 10. The ratio of the metal alkyl or aryl to the alkyl metal polyhalide may be varied from a large quantity of the metal alkyl or aryl to a large quantity of the alkyl metal polyhalide being present. When a small quantity of the alkyl metal polyhalide is employed in combination with a large quantity of a metal alkyl to reduce the transition metal halide, the activity of the resulting catalyst will be greater than the activity of the metal alkyl alone and greater than the additive effect of both components. Similarly, a small quantity of the metal alkyl added to the alkyl metal polyhalide will increase the activity beyond that obtainable with the alkyl metal polyhalide alone or the additive effect of both reducing components. Since, however, the metal alkyls and aryls are reducing agents which result in catalyst systems significantly more active than catalyst system obtained with alkyl metal polyhalides, it is preferred to employ molar ratios of metal alkyls or metal aryls to alkyl metal polyhalides which exceed 1.

The quantity of the active catalyst should be sufficient to give rise to a desirable polymerization rate. Quantities generally employed range from 0.001 to 10% by weight of the monomer.

The extreme activity of the catalyst of the present invention makes a versatile polymerization process possible. Generally, the polymerization of ethylene, in accordance with the present invention, is carried out in the presence of a diluent. Suitable diluents are inert hydrocarbon solvents, such as cyclohexane, decane, xylene and toluene. Where the monomer is liquid at polymerization conditions, the monomer itself may be used as the diluent. The reaction temperature may be varied from below 0° to temperatures above 300° C., the preferred range being from room temperature to 250° C. Pressures also may be varied over a wide range, but are preferably within a range of 1 to 2000 atmospheres. The process of the present invention may be carried out in batch or continuous operation.

The synergistic catalytic effect obtained from the combination of metal hydrocarbon compounds with alkyl metal polyhalides in coordination catalysts is further illustrated by the following examples.

*Example I*

Into a 500 ml. flask equipped with stirrer, condenser and gas inlet and outlet means was charged under an atmosphere of ethylene, 100 ml. of decahydronaphthalene. The reactants were agitated and heated to 110° C. The quantity of titanium tetrachloride set forth in the table below was injected into the reaction medium. This was followed by the injection of ethyl aluminum dibromide in quantities set forth below, and followed immediately by the addition of diphenyl magnesium (containing some minor quantity of phenyl magnesium bromide) in the amounts set forth below. The ethylene pressure and temperature were carefully maintained at 1 atmosphere and 110° C. respectively. The amount of ethylene added to the reaction system was measured at regular time intervals. The polymerization was stopped after 120 minutes of continuous agitation. The reaction mixture was cooled to room temperature and poured into an excess quantity of methanol. A white, solid polymer of ethylene was obtained. The experiments were repeated employing titanium tetrachloride with ethyl aluminum dibromide, and titanium tetrachloride with diphenyl magnesium as the catalyst components for the polymerization. The following results were obtained.

| Catalyst Components | Quantity in Micromoles | Ethylene Polymerized After— | | | | |
|---|---|---|---|---|---|---|
| | | 5 Min. | 10 Min. | 20 Min. | 60 Min. | 120 Min. |
| | | $Cm.^3$ | $Cm.^3$ | $Cm.^3$ | $Cm.^3$ | $Cm.^3$ |
| Titanium tetrachloride | 32 | 800 | 1,240 | 1,650 | 2,260 | 2,600 |
| Diphenyl magnesium | 64 | | | | | |
| Ethyl aluminum dibromide | 32 | | | | | |
| Titanium tetrachloride | 32 | 480 | 660 | 880 | 1,410 | 1,520 |
| Diphenyl magnesium | 64 | | | | | |
| Titanium tetrachloride | 32 | | | | | 21 |
| Ethyl aluminum dibromide | 32 | | | | | |
| Titanium tetrachloride | 32 | No measurable quantities polymerized | | | | |
| Ethyl aluminum dibromide | 160 | | | | | |

In the run employing diphenyl magnesium and ethyl aluminum dibromide, 2.02 g. of high molecular weight polyethylene was obtained as compared to 1.18 g. of high molecular weight polyethylene obtained by using the diphenyl magnesium alone.

*Example II*

Employing the polymerization procedure of Example I, with lithium aluminum tetraheptyl, titanium tetrachloride and ethyl aluminum dibromide, the following results were obtained.

| Catalyst Components | Quantity in Micromoles | Ethylene Polymerized After 120 Min., cm.³ |
|---|---|---|
| Titanium tetrachloride | 32 | 1,885 |
| Lithium aluminum tetraheptyl | 51 | |
| Ethyl aluminum dibromide | 32 | |
| Titanium tetrachloride | 32 | 465 |
| Lithium aluminum tetraheptyl | 51 | |
| Titanium tetrachloride | 32 | 21 |
| Ethyl aluminum dibromide | 32 | |

The initial rate of ethylene adsorbed in the polymerization run employing the synergistic pair of reducing agents was 50 cm.³/min. The initial rate of ethylene adsorption employing lithium aluminum tetraheptyl was 20 cm.³/min. After 120 minutes, the rate of adsorption of ethylene employing the combination of lithium aluminum tetraheptyl and ethyl aluminum dibromide was 15.7 cm.³/min. as compared to 3.9 cm.³/min. for the lithium aluminum tetraheptyl alone. The polymer obtained in the first run weighed 1.45 g. The polymer obtained in the second run weighed 0.36 g. In both runs the polymer obtained was high molecular weight polyethylene that could be compression molded into tough, cold-drawable films.

*Example III*

Employing the polymerization procedure of Example I with titanium tetrachloride, diphenyl magnesium and dibutyl tin dichloride, the following results were obtained.

| Catalyst Components | Quantity in Micromoles | Ethylene Polymerized After 120 min. |
| --- | --- | --- |
| Titanium tetrachloride | 32 | 2,260 cc. |
| Diphenyl magnesium | 64 | |
| Dibutyl tin dichloride | 31 | |
| Titanium tetrachloride | 32 | 1,520 cc. |
| Diphenyl magnesium | 64 | |
| Titanium tetrachloride | 32 | No measurable quantity polymerized. |
| Dibutyl tin dichloride | 155 | |

The initial rate of ethylene adsorption in the polymerization run employing the synergistic pair of reducing agents was 57 cm.$^3$/min. The initial rate of ethylene adsorption employing diphenyl magnesium was 43 cm.$^3$/min. After 120 minutes, the rate of adsorption of ethylene employing the combination of diphenyl magnesium and dibutyl tin dichloride was 18.8 cm.$^3$/min. as compared to 7.5 cm.$^3$/min. for the diphenyl magnesium alone. The polymer obtained with the combination of reducing agents weighed 1.75 g. The polymer obtained in the run employing diphenyl magnesium weighed 1.18 g. In both runs the polymer obtained was high molecular weight polyethylene. The polymer could be compression molded into tough cold-drawable films.

*Example IV*

Employing the polymerization procedure of Example I, with titanium tetrachloride, diphenyl magnesium and dibutyl antimony trichloride, the following results were obtained.

| Catalyst Components | Quantity in Micromoles | Ethylene Polymerized After 120 min. |
| --- | --- | --- |
| Titanium tetrachloride | 32 | 2,000 cc. |
| Diphenyl magnesium | 64 | |
| Dibutyl antimony trichloride | 32 | |
| Titanium tetrachloride | 32 | 1,520 cc. |
| Diphenyl magnesium | 64 | |
| Titanium tetrachloride | 32 | No measurable quantities polymerized. |
| Dibutyl antimony trichloride | 150 | |

*Example V*

Into a 500 ml. flask equipped with stirrer, condenser and gas inlet and outlet means was charged under an atmosphere of propylene, 100 ml. of decahydronaphthalene. The reactants were agitated and heated to 110° C. The quantity of titanium tetrachloride set forth in the table below was injected into the reaction medium. This was followed by the injection of ethyl aluminum dibromide in quantities set forth below, and followed immediately by the addition of diphenyl magnesium (containing some minor quantity of phenyl magnesium chloride) in the amounts set forth below. The propylene pressure and temperature were carefully maintained at 1 atmosphere and 110° C. respectively. The amount of propylene added to the reaction system was measured at regular time intervals. The polymerization was stopped after 120 minutes of continuous agitation. The reaction mixture was cooled to room temperature and poured into an excess quantity of methanol. A white, solid polymer of propylene was obtained. The experiment was repeated employing titanium tetrachloride with ethyl aluminum dibromide, and titanium tetrachloride with diphenyl magnesium as the catalyst components for the polymerization. The experiment was also repeated employing aluminum triisobutyl as a reducing agent.

| Catalyst Components | Quantity in Micromoles | Propylene Polymerized After 120 Minutes, cm.$^3$ |
| --- | --- | --- |
| Titanium tetrachloride | 32 | 415 |
| Diphenyl magnesium | 64 | |
| Ethyl aluminum dibromide | 32 | |
| Titanium tetrachloride | 32 | 91 |
| Diphenyl magnesium | 64 | |
| Titanium tetrachloride | 32 | less than 1 |
| Ethyl aluminum dibromide | 32 | |
| Titanium tetrachloride | 32 | 120 |
| Aluminum triisobutyl | 112 | |

In the run employing diphenyl magnesium and ethyl aluminum dibromide, 0.62 g. of high molecular weight polypropylene was obtained as compared to 0.14 g. of high molecular weight polypropylene obtained by using the diphenyl magnesium alone and 0.18 g. of high molecular weight polypropylene obtained by using aluminum triisobutyl.

*Example VI*

Employing the polymerization procedure described in Example V, propylene was polymerized employing a catalyst formed by the reaction of 32 micromoles of titanium tetrachloride, 64 micromoles of diphenyl magnesium and 32 micromoles of ethyl aluminum dibromide. The polymerization temperature was maintained at 70° C. The propylene polymerized after 120 minutes was 900 cm.$^3$ giving rise to 1.10 g. of a white solid polymer of propylene.

*Example VII*

Example VI was repeated employing 170 micromoles of ethyl aluminum dibromide instead of 32 micromoles. In a period of 120 minutes 1170 cm.$^3$ of propylene was polymerized giving rise to 1.74 g. of a solid polypropylene.

*Examples VIII to XIV*

Using the atmospheric presure polymerization technique described in Example I, synergistic catalytic activity is obtained at the conditions and with the monomers shown in the table below using the catalyst components in the concentrations listed in the table. Solid, high molecular weight polymers of ethylene or propylene are obtained in all instances. The quantity of inert hydrocarbon solvent employed in each polymerization run was 200 ml. of decahydronaphthalene.

| Example | Catalyst System in millimoles | Monomer | Polymerization Rate, g. of polymer in 1 hr. |
| --- | --- | --- | --- |
| VIII | 0.5 mM TiBr$_4$ / 1.5 mM (CH$_3\phi$)$_2$Mg | ethylene | 24 g./hr. |
|  | 0.5 mM TiBr$_4$ / 3 mM EtAlCl$_2$ | do | no substantial polymer formation. |
|  | 0.5 mM TiBr$_4$ / 3 mM EtAlCl$_2$ / 1.5 mM (CH$_3\phi$)$_2$Mg | do | 35 g./hr. |
| IX | 0.5 mM ZrCl$_4$ / 1.5 mM (CH$_3\phi$)$_2$Mg | do | 16 g./hr. |
|  | 0.5 mM ZrCl$_4$ / 3 mM EtAlCl$_2$ | do | no substantial polymer formation. |
|  | 0.5 mM ZrCl$_4$ / 3 mM EtAlCl$_2$ / 1.5 mM (CH$_3\phi$)Mg | do | 25 g./hr. |
| X | 0.5 mM TiCl$_4$ / 1.5 mM Cd(Et)$_2$ | do | 4 g./hr. |
|  | 0.5 mM TiCl$_4$ / 3 mM EtAlCl$_2$ | do | no substantial polymer formation. |
|  | 0.5 mM TiCl$_4$ / 3 mM EtAlCl$_2$ / 1.5 mM Cd(Et)$_2$ | do | 7 g./hr. |

| Example | Catalyst System in millimoles | Monomer | Polymerization Rate, g. of polymer in 1 hr. |
|---|---|---|---|
| XI | 0.5 mM VCl₄<br>1.5 mM mercenealuminum organometallic. | ethylene | 20 g./hr. |
|  | 0.5 mM VCl₄<br>1.5 mM EtSbCl₂ | ---do--- | 3 g./hr. |
|  | 0.5 mM VCl₄<br>1.5 mM mercenealuminum organometallic.<br>1.5 mM EtSbCl₂ | ---do--- | 21 g./hr. |
| XII | 0.5 mM VOCl₃<br>1 mM Al(Et)₃ | ---do--- | 20 g./hr. |
|  | 0.5 mM VOCl₃<br>1.5 mM Bu₂SnCl₂ | ---do--- | 6 g./hr. |
|  | 0.5 mM VOCl₃<br>1.5 mM Bu₂SnCl₂<br>1 mM Al(Et)₃ | ---do--- | 33 g./hr. |
| XIII | 0.5 mM VCl₃<br>1 mM Zn(Bu)₂ | propylene | 12 g./hr. |
|  | 0.5 mM VCl₃<br>1 mM EtAlCl₂ | ---do--- | 4 g./hr. |
|  | 0.5 mM VCl₃<br>1 mM EtAlCl₂<br>1 mM Zn(Bu)₂ | ---do--- | 21 g./hr. |
| XIV | 1 mM TiCl₃<br>1 mM Al(Et)₃ | ---do--- | 22 g./hr. |
|  | 1 mM TiCl₃<br>1 mM EtAlCl₂ | ---do--- | no substantial polymer formation. |
|  | 1 mM TiCl₃<br>1 mM EtAlCl₂<br>1 mM Al(Et)₃ | ---do--- | 31 g./hr. |

The results obtained in the foregoing examples show that the increase in catalytic activity obtained by the process of the present invention through the combination of metal hydrocarbon compounds and alkyl metal halides is not additive, but synergistic. It is to be understood that the foregoing examples are illustrative only, and that numerous embodiments of the invention will occur to those skilled in the art. Thus, for the sake of accurately determining the reaction rates, the polymerizations described herein were carried out on a small scale and at atmospheric conditions. Similar results are, of course, obtained on large scale and continuous polymerizations at greater pressures. While the synergistic action is observed over a wide range of temperatures as hereinabove set forth, it is especially pronounced at temperatures high enough to produce a solution of the polymer, e.g., temperatures above 100° C.

The synergistic effect of the combined reducing agents employed in the catalyst of the present invention is independent of the monomer employed and increases the catalytic activity of the reduced polyvalent metal complex per se. Thus, this surprising increase in activity and the increase of yield resulting from such activity will be found with all hydrocarbon monomers which can be polymerized by the coordination catalyst system and is in particular applicable to terminally unsaturated alkenes, and mixtures thereof, such as ethylene, propylene, butene-1, etc.

The present invention is thus of great value in the manufacture of linear, high density polyethylene and other high molecular weight hydrocarbon polymers, since the increased activity of the catalyst is capable of polymerizing ethylenically unsaturated monomers to higher molecular weight and increased yield as compared to prior art methods.

This application is a continuation-in-part of application Serial No. 578,874, filed April 18, 1956 and application Serial No. 612,927, filed October 1, 1956.

We claim:

1. A catalyst composition, consisting essentially of the product formed by admixing in an inert liquid diluent a transition metal halide, wherein the metal is an element of groups IV-B and V-B of the periodic table of elements and is at a valence state above two, with a reducing component consisting essentially of a combination of (1) an alkyl metal polyhalide wherein the metal is a member of the class consisting of tin and antimony, said alkyl metal polyhalide containing at least two halogens and at least one alkyl group and (2) an organometallic compound having the general formula MR, where M is a metal selected from metals in groups II and III-A of the periodic table of elements and R is a hydrocarbon radical, said organometallic compound consisting of metal bonded to hydrocarbon radicals, the molar ratio of said combination of reducing agents to said transition metal halide varying from 0.3 to 10, and the molar ratio of the organometallic compound MR to the polyalkyl metal halide being at least one.

2. The catalyst composition set forth in claim 1 wherein the transition metal is selected from group IV-B.

3. The catalyst composition set forth in claim 1 wherein the halide is a chloride.

4. The catalyst composition set forth in claim 1 wherein the transition metal is selected from group V-B.

5. The catalyst composition set forth in claim 4 wherein the halide is a chloride.

6. The process of polymerizing a terminally unsaturated alkene at a temperature of 0 to 300° C. and a pressure of 1 to 2000 atmospheres with the catalyst composition set forth in claim 1 in an inert liquid hydrocarbon.

7. The process set forth in claim 6 wherein the alkene is ethylene.

8. The process set forth in claim 7 wherein the alkene is propylene.

9. A catalyst composition consisting essentially of the product formed by admixing, in an inert liquid diluent, a titanium halide wherein the titanium is at a valence state above two, with a reducing component consisting essentially of a combination of (1) an alkyl metal polyhalide, wherein the metal is a member of the class consisting of tin and antimony, said alkyl metal polyhalide containing at least two halogens and at least one alkyl group, and (2) an organometallic compound having the general formula MR, where M is a metal selected from metals in groups II and III-A of the periodic table of elements and R is a hydrocarbon radical, said organometallic compound consisting of metal bonded to hydrocarbon radicals, the molar ratio of said combination of reducing agents to said titanium halide varying from 0.3 to 10, and the molar ratio of the organometallic compound MR to the polyalkyl metal halide being at least one.

10. The catalyst composition set forth in claim 9 wherein the organometallic compound is a magnesium diaryl.

11. The catalyst composition set forth in claim 9 wherein the titanium halide is titanium tetrachloride.

12. The catalyst composition set forth in claim 9 wherein the titanium halide is titanium trichloride.

13. The catalyst composition set forth in claim 9 wherein the organometallic compound is an alkali metal aluminum tetraalkyl.

14. The catalyst composition set forth in claim 13 wherein the alkali metal aluminum tetraalkyl is a lithium aluminum tetraalkyl.

15. The catalyst composition set forth in claim 9 wherein the organometallic compound is an aluminum hydrocarbon compound.

16. The catalyst composition set forth in claim 14 wherein the aluminum trihydrocarbon is an aluminum trialkyl.

17. The catalyst composition set forth in claim 9 wherein the organometallic compound is zinc dialkyl.

18. A catalyst composition consisting essentially of the product formed by admixing in an inert liquid diluent, a vanadium halide wherein the vanadium is at a valence state above two with a reducing component consisting essentially of a combination of (1) an alkyl metal polyhalide wherein the metal is a member of the class consisting of tin and antimony, said alkyl metal polyhalide containing at least two halogens and at least one alkyl group, and (2) an organometallic compound having the general formula MR, where M is a metal selected from the metals in groups II and III-A of the periodic table and R is a hydrocarbon radical, said organometallic compound consisting of metal bonded to hydrocarbon radicals, the molar ratio of said combination of reducing agents to said vanadium halide varying from 0.3 to 10, and the molar ratio of the organometallic compound MR to the polyalkyl metal halide being at least one.

19. The catalyst composition set forth in claim 18 wherein the organometallic compound is a magnesium diaryl.

20. The catalyst composition set forth in claim 18 wherein the organometallic compound is an aluminum trihydrocarbon.

21. The catalyst composition set forth in claim 18 wherein the organometallic compound is an alkali metal aluminum tetraalkyl.

22. The catalyst composition set forth in claim 18 wherein the vanadium halide is vanadium tetrachloride.

23. The catalyst composition set forth in claim 18 wherein the vanadium halide is vanadium oxytrichloride.

References Cited in the file of this patent

UNITED STATES PATENTS

| | | |
|---|---|---|
| 2,904,542 | Fasce et al. | Sept. 15, 1959 |
| 2,908,674 | Nowlin et al. | Oct. 13, 1959 |
| 2,954,367 | Vandenberg | Sept. 27, 1960 |
| 2,959,579 | Reed et al. | Nov. 8, 1960 |
| 2,976,271 | Lippincott et al. | Mar. 21, 1961 |

FOREIGN PATENTS

| | | |
|---|---|---|
| 789,781 | Great Britain | Jan. 29, 1958 |

UNITED STATES PATENT OFFICE
CERTIFICATE OF CORRECTION

Patent No. 3,118,865                                                January 21, 1964

John MacMillan Bruce, Jr., et al.

It is hereby certified that error appears in the above numbered patent requiring correction and that the said Letters Patent should read as corrected below.

Column 2, line 14, for "quantites" read -- quantities --; column 3, line 21, for "large" read -- larger --; column 7, in the table, under the heading "Polymerization Rate, g. of polymer in 1 hr.", fourth line thereof, for "20 g./hr." read -- 31 g./hr --; column 8, line 11, for the claim reference numeral "1" read -- 2 --; column 8, line 56, for the claim reference numeral "14" read -- 15 --.

Signed and sealed this 28th day of July 1964.

(SEAL)

Attest:

ESTON G. JOHNSON                                        EDWARD J. BRENNER
Attesting Officer                                         Commissioner of Patents